United States Patent Office 3,200,869
Patented Aug. 17, 1965

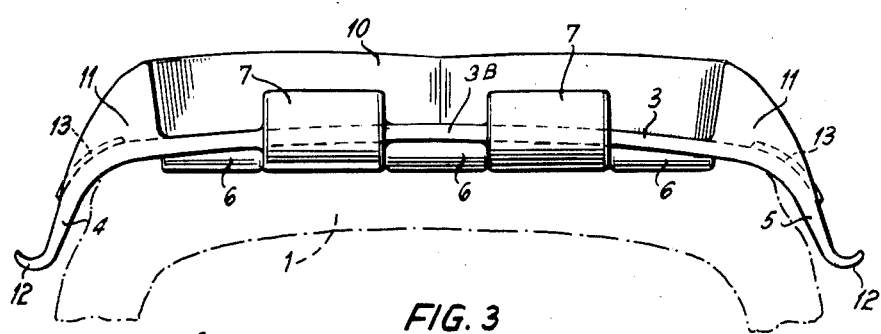
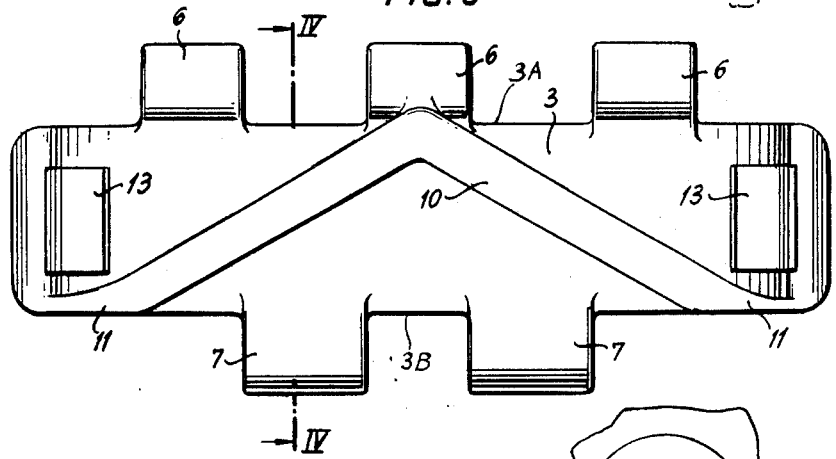
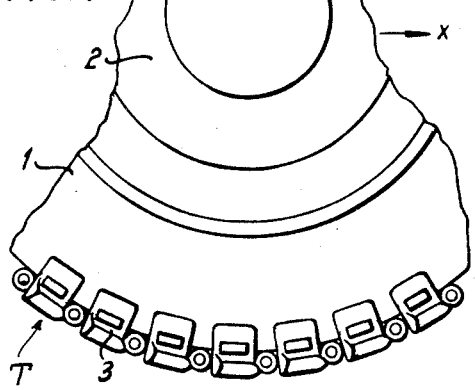
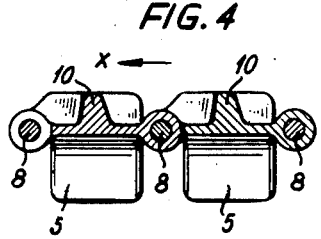
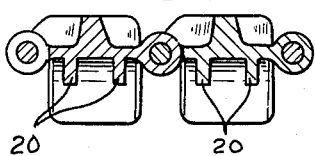
INVENTOR.
Heinz Asbeck

1

3,200,869
TRACTOR TREAD FOR USE ON RUBBER TIRE VEHICLES
Heinz Asbeck, Hagen, Westphalia, Germany, assignor to Idealspaten- und Schaufelwalzwerk vorm. Eckardt & Co. G.m.b.H., Herdecke, Ruhr, Germany, a corporation of Germany
Filed Mar. 16, 1964, Ser. No. 352,284
Claims priority, application Germany, June 14, 1963, J 23,875
5 Claims. (Cl. 152—182)

This invention relates in general to a tractor tread for use on wheeled vehicles having rubber tires, and more specifically to an improved tractor tread and shoe element therefor for completely circumscribing a wheel of a rubber tire equipped vehicle so as to enhance the traction thereof.

Heretofore, tractor treads of the type composed of relatively flat metal plates and hinged together have been provided with calklike ribs on the respective contact surfaces thereof. However, the known tractor treads utilized a relatively large number of longitudinally and transversely extending calklike ribs on the contact surfaces of the individual shoe members. The intersection of such transversely and/or longitudinally extending ribs effected the sub-division of the contact surface of the shoe elements into a plurality of relatively small areas or squares of wafer shape design. Such designs, however, have the conspicuous disadvantage in that during movement of a vehicle, utilizing such treads, over soft and especially clay like soil or earth, the clayish material would lodge almost immediately in the areas or squares of the design to fill the same with a more or less compact mass that may extend beyond the height or limit of the ribs so that such ribs no longer protrude. When this occurred, the ribs become ineffective and thus adequate traction was no longer possible between the tractor tread so constructed and the earth over which the vehicle was moving. As a result, frequent cleaning of such contact surface for such shoes was required. Thus, every such shoe cleaning operation represented a lost or wasted time. In addition it constituted a tedious and laborious task. Further, the results of such shoe cleaning were short lived, as they would almost immediately become clogged with the soft or clay earth.

A further disadvantage of the plate like, tractor shoe elements of known construction is the continuous kneading or loading of the tire side walls against the side edges of the shoe plate because of the close clearance or even tangential contact of the tractor shoe side edges against the wheel tire. This condition becomes especially aggravated with the low pressure tires commonly used today. Consequently, such loadings greatly reduce the useful life of the tire utilizing the tractor shoes of known constructions. This difficulty becomes particularly more pronounced when the tires are not inflated to the prescribed pressure, or which are exposed to shock loadings due to unevenness in ground as is the rule with vehicles whose wheels are provided with these tractor type shoes. Because of such shock loadings, as a result of unevenness in ground, the tires tend to deform and thereby press against the side ends of the shoe elements, which do not yield. Consequently such tire deformations cause the sidewall of the tires to bite into the rigid side edges of the tire shoes. When this occurs for a sufficient number of times, the sidewalls of the tire tend to fail or be cut on the side edges of the tractor shoes and thus greatly reduce the useful life of such tires.

In addition, the lateral side pieces of the known plate like shoe elements are exposed to the dangers of deformation from pebbles, stones, and rocks which may press against the side edge thereof. Also, uneven motion of the vehicle is another disadvantage of the known calklike rib or web arrangements on the tractor shoes now generally known.

Therefore, it is an object of this invention to provide an improved tractor tread which alleviates the disadvantages of the known tractor tread constructions.

It is another object to provide an improved shoe element of which several can be hingedly linked together to make up an improved tractor tread.

It is another object of this invention to provide an improved tractor tread and shoe element therefor for effecting improved traction between the wheel vehicle and the ground over which it travels.

It is still another object of this invention to provide an improved tractor tread and shoe element therefor which prohibits or minimizes the danger of lateral slippage of vehicles which have its wheels equipped with such treads.

It is another object to provide a tractor tread of hinged shoe elements which have an improved grouser construction arranged to effect a self cleaning action, and thereby reduce to a minimum the time, heretofore wasted in cleaning such shoes.

It is another object to provide an improved tractor shoe having a grouser construction constructed and arranged so as to strengthen the same against the dangers of deformation.

It is another object of this invention to provide an improved grouser construction for use on a tractor shoe which is constructed and arranged so as to act as a deflector against laterally engaging or striking stones.

It is another object of this invention to provide a tractor tread and shoe construction therefor having improved grouser elements constructed and arranged so as to achieve high adhesion and traction, while at the same time being substantially self cleaning in operation and capable of effecting positive traction as a result of the minimizing of the danger to lateral slippage.

Still another object of the invention is to provide an improved tractor tread and shoe element therefor that is relatively quiet in operation.

It is another object of this invention to provide an improved tractor shoe constructed and arranged so that the side surfaces of the shoe which envelop the side of the tire are outwardly and obliquely curved so as to provide a clearance between the side pieces of the respective shoes and the sidewalls of the tire to thereby permit the tires to deform without causing its sidewalls to frictionally engage or rub against the side pieces of the tractor shoes.

It is another object to provide an improved tractor tread and shoe element for enhancing increased traction and climbing capacity.

Still another object is to provide a tractor tread and shoe element therefor capable of enhancing the pushing power and loading performance of a vehicle using the same due to the improved gripping strength and durability of the tread without adversely affecting the operating speed of the vehicle.

It is another object to provide an improved tractor tread and shoe element therefor which will substantially minimize the cost and effort of maintaining the same.

It is another object to provide a tractor tread and shoe element which will eliminate slippage, and thereby increase fuel economy of the vehicles utilizing the same.

A feature of this invention resides in an improved grouser construction which will not damage pavements because of the flexible retraction of the tire upon ground contact.

Another feature of this invention resides in the provision of a tractor tread and shoe element therefor which will not damage or adversely affect the operation of a vehicle utilizing the same.

Another feature of this invention resides in the provision that the tractor treads and shoe element thereof will protect the tire from excessive wear due to the absence of any friction therebetween.

Another feature of this invention resides in the provision that the respective shoe elements which make up the tractor tread of the instant invention are so constructed and arranged so that damage to the tires is rendered virtually impossible thereby. That is stones will not become lodged between the tires and the shoe element due to the specific construction of the flanges which prevents any objects from entering therebetween.

The foregoing objects, features, and other advantages of this invention are attained by a tractor tread comprising a plurality of similarly constructed plate like shoe elements which are hingedly secured together so as to completely circumscribe the circumference of a rubber tire wheel of a vehicle. The particular construction of the respective shoe elements is such that it will avoid all the disadvantages above referred to, while at the same time achieving important substantial advantages with respect to enhancing the transmission of power between the tractor tread and the roadway. At the same time the danger of lateral slippage of vehicles whose wheels are equipped with a tractor tread of this invention is substantially minimized or prohibited. Accordingly, the advantages are attained by a shoe element which is defined as a shallow U-shaped arcuate shoe whereby the side or end portions envelop the sidewalls of a rubber tire vehicle. The contact surface of the respective shoe elements are each provided with only one V-shaped gripping rib or grouser whose apex lie in the vicinity of a central region along the leading longitudinal edge portion of the shoe, and with the wing end portions of the rib or grouser extending to the ends of the shoe along the trailing longitudinal edge portion. This V-shaped form of gripping web, rib or grouser gives an improved favorable transfer of tensile and shear forces and also greater climbing ability while simultaneously counteracting through braking action exerted by the obliquely placed arms of the V-shaped gripping web or grouser, the danger of lateral slippage of the vehicle, as for example, when such vehicles are on slopes.

The profile of the V-shaped gripping web, rib or grouser in accordance with this invention tapers outwardly, preferably in trapezoidal form, in cross section, so that the soil, clay and the like entering the space open over its full width and bounded on one side by the gripping web, again falls out under the simultaneous effects of the circumstance that the engagement position of the gripping web enlarges when the web emerges from the ground; that is, a self cleaning effect is obtained, and is further perfected by the relative displacements of the neighboring shoe elements with respect to each other movement.

Another characteristic of the instant invention is that the V-shaped web or grouser is constructed in such a fashion that its wing end edges run into radially curved side ends or portions of the plate like shoe element and that in this manner it additionally strengthens the shoe against the danger of deformation. In addition the end portions of the V-shaped gripping web or grouser which run into the laterally curved side ends of the shoe further act as deflectors for laterally engaging or striking stones. As a result, the gripping webs made in the manner described simultaneously achieve high adhesion and traction, self cleaning of the chain, and positive traction because of elimination of danger of lateral slip.

The quiet running of the vehicle is achieved by the entry of the point or apex of the web or grouser of the succeeding plate into the contact surface, while the sidepiece ends of the V-shaped web of previous plate members are still in contact.

Another important characteristic of the instant construction is that the shoe elements and curved sidepieces which envelop the side walls of the tires are outwardly curved obliquely so that there is formed a clearance between the sidepieces of the respective shoes and the sidewall of the tire. This permits the tire to deform without having its sidewalls rub against the curve sidepieces of the shoe element. This curving of the shoe sidepieces or ends is made possible by the stiffening provided by the wing ends of the V-shaped gripping web or grouser which extend into the sidepieces of the shoe element and giving them sufficient strength even in the obtusely bent position.

Other features and advantages will become more readily apparent when considered in view of the drawings and description in which, FIGURE 1 is a partial view of a wheel provided with a tractor tread embodying the shoe elements of the instant invention.

FIGURE 2 shows a front elevation view of a shoe element which makes up the tractor tread of the instant invention.

FIGURE 3 is a plan view of FIG. 2.

FIGURE 4 is a sectional view taken along line 4—4 of FIG. 3.

FIGURE 5 is a sectional view similar to that of FIG. 4 but showing a slightly modified form of the embodiment.

Referring to the drawings, FIG. 1 shows generally a pictorial illustration of the tractor tread T composed of a plurality of similarly constructed shoe elements 3 made in accordance with the invention and enveloping the circumference of a tire 1 mounted on a wheel 2 of a vehicle. The plate or shoe elements 3, as particularly shown in FIGS. 2, 3 and 4 which make up the tractor tread circumscribing the wheel 2, each comprise of a shoe 3 formed of a plate member having a crown portion which is slightly curvilinear in cross section, and which is provided at its ends region with laterally bent side extensions 4, 5 to define a substantially shallow U-shape arcuate shoe member whereby the side extensions of the shoe envelop the opposed side walls of a tire 1. Thus, as best seen in FIG. 3, each of the respective shoe elements 3 is provided with a leading longitudinal edge portion 3A and a substantially parallel disposed trailing longitudinally extending edge portion 3B. Connected to both longitudinal edge portions of the shoe element and projecting therefrom are a plurality of mutually displaced hinged ears 6 and 7 respectively, each being formed with a bore extending therethrough for receiving a hinge pin or bolt 8 by which adjacent shoe elements 3 are hingedly connected.

In the illustrated embodiment, it will be noted that three hinge ears 6 are spaced along the longitudinal leading edge 3A of the tractor shoe, and that two such ears 7 are disposed along the trailing edge 3B of the shoe. The arrangement is such that the hinge ears 7 on the trailing edge 3B of one shoe are adapted to be disposed in the spaces formed between adjacent ears 6 connected to the lading edge 3A of an adjacent shoe. When adjacent shoes 3 are fitted together, the hinge ears 7 connected to the trailing edge of one shoe complement the hinge ears 6 connected to the leading edge of the next adjacent shoe element. Therefore, with the adjacent shoe elements 3 having their complementary hinge ears disposed in alignment, a hinge pin 8 may be readily inserted through the bores of the aligned hinge ears, and thereby one shoe element is hingedly secured to the next adjacent shoe element.

Formed on the contact surface of each of the shoe elements is a V-shaped rib, web or grouser 10 which has its apex or point directed in the direction in which the wheel rolls, i.e. the apex of the grouser 10 is disposed at the central region along the leading longitudinal edge portion 3A of the shoe 3.

As shown in FIG. 4, the cross sectional configuration of the web or grouser 10 tapers outwardly to define a trapezoidal cross-section with the wing ends 11 extending from the forward longitudinal edge 3A in the region of the central hinge ear 6 and extending to the ends of the shoe toward the trailing edge 3B of the shoe, thereby forming an obtuse angle which is determined by the width of the shoe. The ends of the wings, as seen in FIG. 2, gradually diminish into the curve side extensions 4 and 5 of the shoe element 3.

For the purpose of adaptation to the external shape of the tire 1, the crown of the shoe element 3 is slightly rounded. In addition, for the same reason and for preventation of a kneading action on the tire, the respective sidepieces 4 and 5 are, as shown at 12, rounded outwardly so that its impression into the tire 1 during tire deformations is positively prohibited.

As shown in FIGS. 2 and 3, a reinforcement plate 13 may be provided on the outer side of the sidepieces 4 and 5. Such reinforcement plates 13 are especially useful for vehicles used on stony and rocky grounds. The reinforcement plates 13 additionally increase the resistance movement of the sidepieces, thus eliminating the danger of their deformation under heavy lateral pressure.

If desired, the central under portion of the respective shoe element can also be strengthened by means of ribs 20. See FIG. 5. Thus FIG. 5 constitutes a slightly modified embodiment. Accordingly, the reinforced ribs 20 on the under surface of the shoe element are constructed and arranged so as to engage the profile grooves of the tire tread, thus, safeguarding the tractor tread and its respective shoe elements against relative displacement with respect to the tire 1.

While the instant invention has been described in detail with reference to a particular embodiment thereof, it will be understood that variations and modifications thereof may be made without departing from the spirit or scope of the invention. Thus, if necessary, the V-shaped web 10 can differ in cross section from the trapezoidal cross section shown.

What is claimed is:

1. A tractor tread for circumscribing a rubber tire wheel of a land vehicle comprising,
    (a) a plurality of mutually connected tractor shoes,
    (b) each of said shoe being formed of plate having a crown portion terminating in downwardly curved side portions to define a shallow U-shape in cross-section thereof so that said shoe is arranged to envelop the crown and adjacent sides of said tire wheel,
    (c) said shoe having a leading longitudinal edge and a trailing longitudinal edge disposed in parallel,
    (d) and a grouser formed on the contact surface of said shoes,
    (e) said grouser being defined as a V-shaped rib having its apex directed towards a central region on said leading longitudinal edge of said shoe, and
    (f) said rib having its opposed wing ends extending toward the trailing longitudinal edge of said shoe, said wing ends having radially and outwardly curved outer end portions gradually diminishing into said curved side portions of said shoe.

2. A tractor tread for individually circumscribing the drive wheels of a rubber tire equipped vehicle comprising,
    (a) a plurality of mutually connected tractor shoes,
    (b) each of said tractor shoes being formed of a plate having a crown portion adapted to embrace the crown of a tire equipped wheel,
    (c) said crown portion having straight parallel disposed leading and a trailing longitudinal edge portions,
    (d) hinge ears having a bore extended therethrough projecting outwardly from each of said longitudinal edge portions whereby the ears on said leading edge complement the ears on said trailing edge of an adjacent shoe,
    (e) a hinge pin extended through the complemental ears of adjacent shoes,
    (f) said plate terminating in laterally bent side extensions to define with said crown portion an essentially shallow U-shaped arcuate shoes whereby said side extensions envelop the opposed sides of a tire, and said side extensions extending at an obtuse angle with respect to said crown portion so as to be spaced from the sidewalls of the tire enveloped thereby,
    (g) said bent side extensions terminating in an outwardly curved reinforcing bead,
    (h) an outwardly projecting grouser rib formed on the contact surface of said crown portion,
    (i) said rib being V-shaped in configuration having its apex directed toward a central region along the leading longitudinal edge portion of said shoe, and
    (j) opposed wing end of said rib extending to the trailing longitudinal edge of said shoe,
    (k) and said wing ends having the respective outer ends thereof gradually diminishing into the adjacent bent side extensions of said shoe.

3. A tractor tread for individually circumscribing the drive wheels of a rubber tire equipped vehicle comprising,
    (a) a plurality of mutually connected tractor shoes,
    (b) each of said tractor shoes being formed of a plate slightly curvi-linear in cross-section to define a crown portion adapted to embrace the crown of a tire equipped wheel,
    (c) said crown portion of said shoe having straight parallel leading and a trailing longitudinal edge portions,
    (d) hinge ears having a bore extending therethrough projecting outwardly from each of said longitudinal edge portions whereby three ears are spaced along said leading edge to complement a pair of spaced ears on said trailing edge of an adjacent shoe,
    (e) a hinge pin extended through the complemental ears of adjacent shoes for hinging together adjacent shoes,
    (f) said plate of each shoe terminating in laterally bent side extensions to define with said crown portion an essentially shallow U-shaped arcuate shoe so that said side extensions envelop the opposed sides of a tire, and said side extensions extending at an obtuse angle with respect to said crown portion so as to be spaced from the sidewalls of the tire enveloped thereby,
    (g) said bent side extensions terminating in an outwardly curved reinforcing bead,
    (h) an outwardly projecting grouser rib formed on the contact surface of said crown portion,
    (i) said rib being V-shaped in configuration having its apex directed toward a central region and in line with the central ear along the leading longitudinal edge portion of said shoe, and
    (j) opposed wing end of said rib extending to the ends of the trailing longitudinal edge of said shoe,
    (k) and said wing ends having its respective outer ends gradually diminishing into the adjacent bent side extensions of said shoe,
    (l) said grouser rib having a substantially uniform trapezoidal cross-section throughout the length thereof,
    (m) means for reinforcing the respective bent side extensions,
    (n) said latter means including a plate reinforcement connected to the outer surface of said shoe,
    (o) and means formed on the under surface of said plate for defining reinforcing ribs arranged to extend into the profile treads of the tire enveloped by said shoe.

4. A tractor tread shoe for use on a rubber tire equipped vehicle comprising,
    (a) a plate having a crown portion adapted to embrace the crown of a tire equipped wheel,
    (b) said crown portion having straight parallel leading and a trailing longitudinal edge portions,
    (c) said crown portion having laterally bent side extensions terminating in an outwardly curved reinforcing bead to define with said crown portion an essentially shallow U-shaped arcuate shoes whereby said side extensions envelop the opposed sides of a tire, (d) an outwardly projecting grouser rib formed on the contact surface of said crown portion, (e) said rib being V-shaped in configuration having its apex directed toward a central region along the leading longitudinal edge portion of said shoe, and (f) opposed wing end of said rib extending to the trailing longitudinal edge of said shoe, and said wing ends having its respective outer ends gradually diminishing into the said side extension of said crown portion.

5. A tractor tread shoe for use on a rubber tire equipped vehicle comprising, (a) a plate having a crown portion adapted to embrace the crown of a tire equipped wheel, (b) said crown portion having straight parallel leading and a trailing longitudinal edge portions, (c) hinge ears having a bore extended therethrough projecting outwardly from each of said longitudinal edge portions whereby three ears are spaced along said leading edge adapted to complement two spaced ears on said trailing edge of a similar shoe, (d) said plate terminating in laterally bent side extensions to define with said crown portion an essentially shallow U-shaped arcuate shoe whereby said side extensions envelop the opposed sides of a tire, and said side extensions extending at an obtuse angle with respect to said crown portion so as to be spaced from the sidewalls of the tire enveloped thereby, (e) said bent side extensions terminating in an outwardly curved reinforcing bead, (f) an outwardly projecting grouser rib formed on the contact surface of said crown portion, (g) said rib being V-shaped in configuration having its apex directed toward a central region along the leading longitudinal edge portion of said shoe, and (h) opposed wing end of said rib extending to the ends of the trailing longitudinal edge of said shoe, (i) and said wing ends having outer ends diminishing gradually into the adjacent bent side extensions of said shoe, (j) said grouser rib being substantially trapezoidal in cross-section, (k) means for reinforcing the respective bent side extensions, (l) said latter means including a plate reinforcement connected to the outer surface of said shoe, (m) and reinforcing ribs formed on the under surface of said plate for extending into the profile treads of the tire enveloped by said shoe.

References Cited by the Examiner

UNITED STATES PATENTS

| | | | |
|---|---|---|---|
| 1,453,530 | 5/23 | Shuey | 152—182 |
| 2,046,299 | 6/36 | Armington | 152—182 |
| 2,764,205 | 9/56 | Armington | 152—182 |
| 2,764,206 | 9/56 | Armington | 152—182 |
| 2,764,207 | 9/56 | Armington | 152—182 |
| 2,764,209 | 9/56 | Armington | 152—182 |

ARTHUR L. LA POINT, *Primary Examiner.*